(12) United States Patent
Heaton (10) Patent No.: US 8,760,311 B2
(45) Date of Patent: Jun. 24, 2014

(54) DOCKING CRADLE INCLUDING A RELEASABLE LATCHING MECHANISM FOR ENGAGING A HANDHELD DEVICE THEREIN

(75) Inventor: Guy M. Heaton, Rancho Santa Margarita, CA (US)

(73) Assignee: Datamax-O'Neil Corporation, Orlando, FL (US)

( * ) Notice: Subject to any disclaimer, the term of this patent is extended or adjusted under 35 U.S.C. 154(b) by 152 days.

(21) Appl. No.: 13/554,253

(22) Filed: Jul. 20, 2012

(65) Prior Publication Data
US 2013/0021164 A1 Jan. 24, 2013

Related U.S. Application Data

(60) Provisional application No. 61/510,144, filed on Jul. 21, 2011.

(51) Int. Cl.
*G08B 21/00* (2006.01)

(52) U.S. Cl.
USPC ............... 340/687; 340/691.6; 340/825.36

(58) Field of Classification Search
USPC ............ 340/687, 686.1, 686.3, 686.5, 691.6, 340/691.7, 3.44, 825.23, 5.1, 5.91, 825.36
See application file for complete search history.

(56) References Cited

U.S. PATENT DOCUMENTS

| | | | | |
|---|---|---|---|---|
| 5,828,749 A | * | 10/1998 | Brodskiy | 379/430 |
| 6,674,364 B1 | * | 1/2004 | Holbrook et al. | 340/568.1 |
| 2004/0268005 A1 | * | 12/2004 | Dickie | 710/303 |
| 2007/0164987 A1 | * | 7/2007 | Graham | 345/156 |

* cited by examiner

*Primary Examiner* — Daniel Previl
(74) *Attorney, Agent, or Firm* — Carter, DeLuca, Farrell & Schmidt, LLP (57) ABSTRACT

A latching mechanism includes a housing defining a slot for receiving a device therein. The housing includes first and second slide blocks disposed on either side of the slot. Each slide block is movable between a retracted position, wherein a pin thereof is disposed within the housing, and an extended position, wherein the pin extends into the slot to engage the device therein. A U-shaped member is disposed within the housing and includes first and second legs interconnected by a base. The U-shaped member is movable relative to the housing between an unlocked position, wherein the legs retain the slide blocks in the retracted position, a locked position, wherein the slide blocks are permitted to move to the extended position, and an eject position, wherein the legs retain the slide blocks in the retracted position and wherein the base extends into the slot to eject the handheld device.

20 Claims, 8 Drawing Sheets

DOCKING CRADLE INCLUDING A RELEASABLE LATCHING MECHANISM FOR ENGAGING A HANDHELD DEVICE THEREIN

CROSS-REFERENCE TO RELATED APPLICATION

This application claims the benefit of and priority to U.S. Provisional Application Ser. No. 61/510,144, which was filed on Jul. 21, 2011 by Guy M. Heaton, the entire contents of which is hereby incorporated by reference herein for all purposes.

BACKGROUND

1. Technical Field

The present disclosure relates to latching mechanisms and, more particularly, to a releasable latching mechanism for securing a handheld computer to a cradle to facilitate charging, data transfer, and/or printing.

2. Description of Related Art

Wireless, or handheld devices are advantageous in that they permit users to conduct business "in the field" without sacrificing any of the benefits that previously required in-office, or in-store equipment. For example, handheld computers allow users to scan items/inventory at the point-of-delivery or point-of-pickup, electronically record transactions at the point-of-sale, receive credit card payments, and electronically record signatures or other user-input data.

In order to further facilitate conducting business transactions "in the field," portable docking and printing stations have been developed which connect to the handheld computers to permit data transfer therebetween, e.g., downloading or uploading of data, charging of the handheld computer, and/or printing of receipts, confirmations, etc. Typically, these docking and printing stations include a cradle for receiving the handheld computer therein in electrical communication therewith to permit charging, data transfer, and/or printing. As can be appreciated, during these operations, it is important to ensure that the handheld computer remains securely engaged within the cradle so as to inhibit disconnection in the event the docking and printing station is moved, manipulated, or even dropped. However, it is also important that the handheld computer be easily engagable with and disengagable from the cradle without requiring excessive force or complicated locking/unlocking procedures.

SUMMARY

In accordance with one embodiment of the present disclosure, a cradle latching mechanism is provided. The cradle latching mechanism includes a housing defining a slot therein that is configured to receive a handheld device therein. The housing includes first and second slide blocks disposed therein on either side of the slot. Each of the slide blocks includes a pin extending therefrom and is movable between a retracted position, wherein the pin is disposed within the housing, and an extended position, wherein the pin extends into the slot to engage the handheld device disposed therein. A U-shaped member is movably disposed within the housing and includes first and second legs interconnected by a base. Each leg is operably coupled to one of the slide blocks. The U-shaped member is movable relative to the housing between an unlocked position, wherein the legs retain the slide blocks in the retracted position to permit insertion of the handheld device into the slot, a locked position, wherein the slide blocks are permitted to move to the extended position to engage the handheld device therein, and an eject position, wherein the legs retain the slide blocks in the retracted position and wherein the base extends into the slot to eject the handheld device partially (or entirely) from the slot.

In one embodiment, the slide blocks are biased toward the extended position.

In another embodiment, audible feedback is provided upon engagement and/or disengagement of the pins and the handheld device.

In another embodiment, insertion of the handheld device into the slot moves the U-shaped member to the locked position to engage the handheld device therein.

In yet another embodiment, the housing includes an aperture defined therethrough adjacent the base of the U-shaped member to facilitate manual movement of the U-shaped member from the locked position to the eject position.

In still another embodiment, each of the slide blocks includes an angled surface configured to slideably engage an angled surface defined at a free end of one of the legs such that, upon movement of the U-shaped member from the unlocked position to the locked position, the angled surfaces of the legs are slid along the angled surfaces of the slide blocks, allowing the slide blocks to move to the extended position.

A system including a handheld device and corresponding docking station is also provided in accordance with the present disclosure. The handheld device includes a pair of opposed notches defined therein. The docking station includes a printer and a cradle coupled to the printer. The cradle includes a housing defining a slot configured to receive the handheld device therein for mechanically engaging the handheld device within the cradle and electrically coupling the handheld device to the printer. The housing includes first and second slide blocks coupled thereto on either side of the slot. Each slide block includes a pin extending therefrom and movable between a retracted position, wherein the pin is disposed within the housing, and an extended position, wherein the pin extends into the slot to engage one of the notches defined within the handheld device. A U-shaped member is disposed within the housing and includes first and second legs interconnected by a base. Each leg is operably coupled to one of the slide blocks. The U-shaped member is movable relative to the housing between an unlocked position, wherein the legs retain the slide blocks in the retracted position to permit insertion of the handheld device into the slot, a locked position, wherein the slide blocks are permitted to move to the extended position to engage the pins within the notches, and an eject position, wherein the legs retain the slide blocks in the retracted position and wherein the base extends into the slot to eject the handheld device partially (or entirely) from the slot.

The housing and/or U-shaped member of the system may be configured similarly to any of the embodiments above. Further, in embodiments, the housing includes one or more electrical contacts disposed therein that are configured to mate with one or more corresponding electrical contact disposed on the handheld device upon engagement of the handheld device and the housing. The U-shaped member may also be configured such that, upon movement to the eject position, the handheld device is both mechanically ejected and electrically disconnected from the docking station.

A method of using a handheld device and corresponding docking station is also provided in accordance with the present disclosure. The method includes providing a handheld device and docking station, e.g., according to any of the embodiments above. The method further includes inserting the handheld device into the slot of the docking station and advancing the handheld device further into the slot of the docking station such that the handheld device contacts at least a portion of the base of the U-shaped member to translate the U-shaped member from an unlocked position to a locked position. Translation of the U-shaped member from the unlocked position to the locked position moves the legs relative to the slide blocks such that the slide blocks are moved into engagement with the handheld device to engage the handheld device and the docking station to one another. The method also includes manually urging the base of the U-shaped member relative to the docking station such that the U-shaped member is translated from the locked position to an eject position. Translation of the U-shaped member from the locked position to the eject position moves the legs relative to the slide blocks such that the slide blocks are disengaged from the handheld device. Translation of the U-shaped member from the locked position to the eject position also ejects the handheld device partially (or entirely) from the slot.

In one embodiment, upon engagement of the handheld device within the docking station, one or more electrical contacts of the handheld device mate with one or more electrical contact of the docking station, e.g., to electrically couple the handheld device and the docking station to one another. In such embodiments, the method may further include electrically communicating between the handheld device and the docking station via the electrical contacts, e.g., to charge the handheld device, print documents stored on the handheld device, transfer data between the handheld device and docking station, etc.

In another embodiment, the method further includes audibly confirming engagement of the handheld device within the docking station and/or audibly confirming disengagement of the handheld device from the docking station.

BRIEF DESCRIPTION OF THE DRAWINGS

Various illustrative embodiments of the present disclosure are described herein with reference to the drawings, wherein.

DETAILED DESCRIPTION

Figure 1:
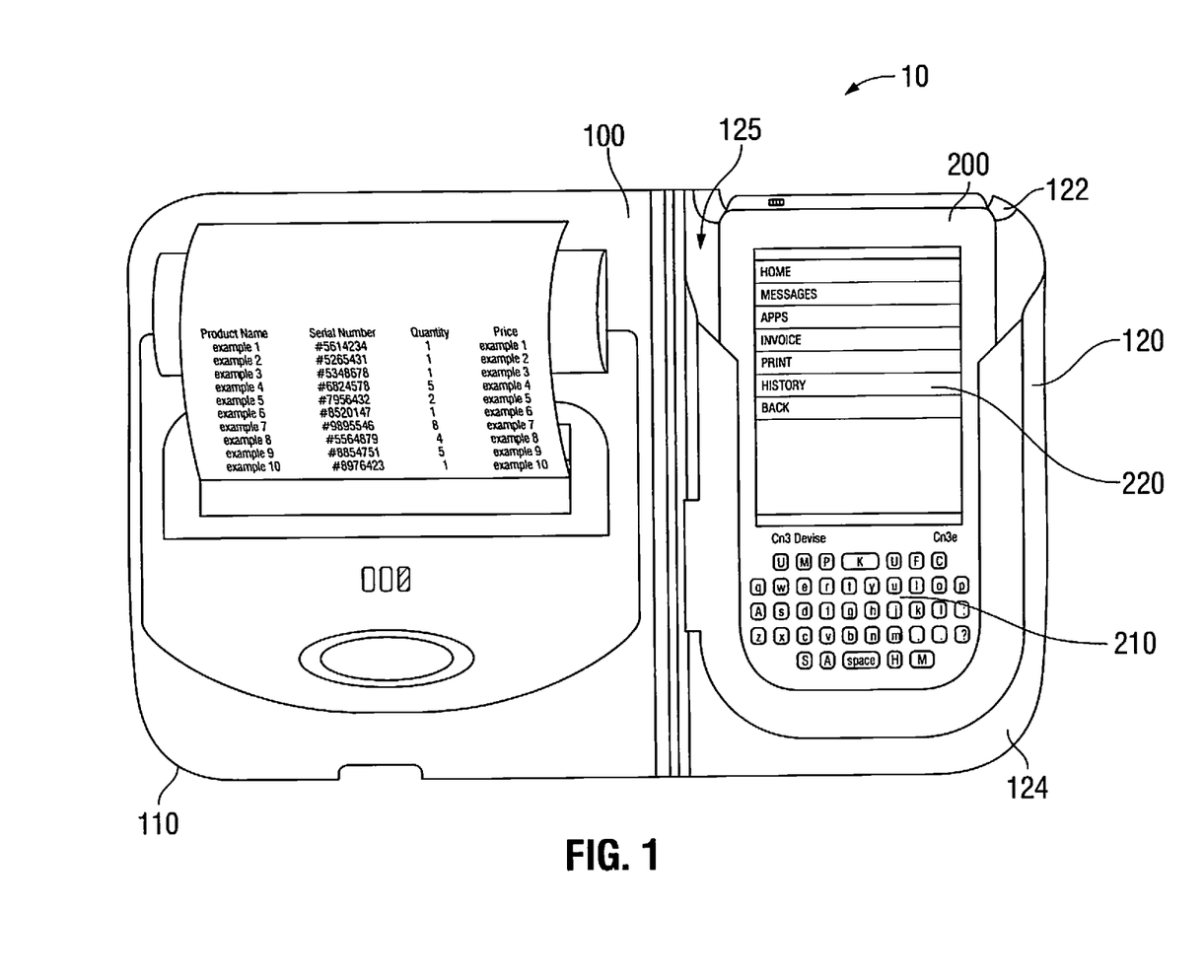
FIG. 1 is a side view of one embodiment of a docking and printing station provided in accordance with the present disclosure, wherein a handheld computer is engaged within the cradle thereof.
Figure 2:
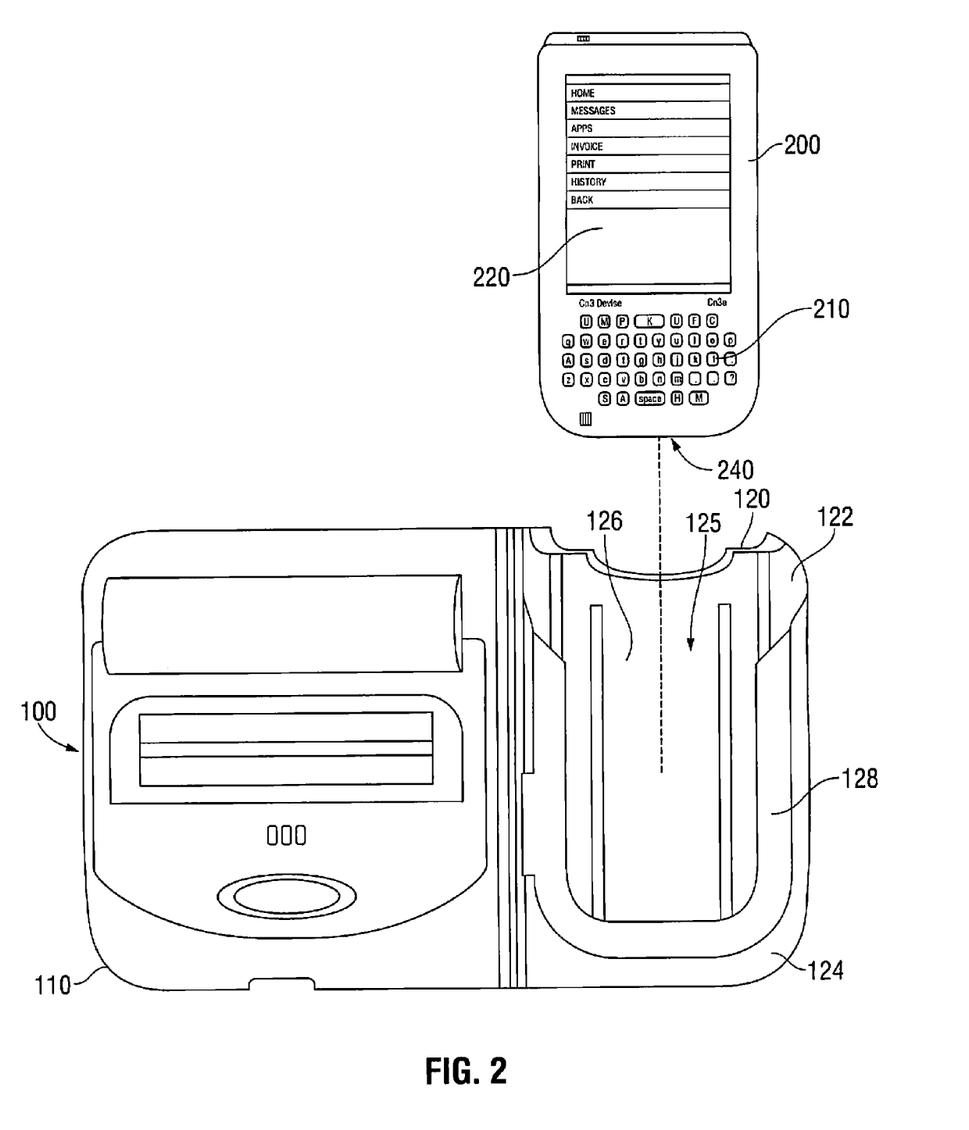
FIG. 2 is a side view of the docking and printing station of FIG. 1, wherein the handheld computer has been removed from the cradle thereof.

Turning now to FIGS. 1-2, a system 10 provided in accordance with the present disclosure is shown generally including a docking and printing station 100 and a handheld computer ("HHC") 200 associated therewith. Although exemplified with respect to docking and printing station 100 and HHC 200, it is envisioned that the principles and features of the present disclosure, described hereinbelow, may similarly be adapted for use in conjunction with any other suitable docking station and corresponding handheld device. Further, it is envisioned that the docking station be configured as a universal docking station capable of engaging various different handheld devices thereon.

With continued reference to FIGS. 1-2, docking and printing station 100 includes a housing 110 and a cradle 120 disposed adjacent housing 110 and configured to receive HHC 200 therein. Housing 110 includes a printing module (not explicitly shown) disposed therein that communicates with HHC 200 to print receipts, confirmations, communications, etc. Housing 110 may further include other electronics disposed therein, e.g., a charging module, wireless communication electronics, data storage electronics, etc., that are adapted to communicate with HHC 200 when HHC 200 is engaged within cradle 120 to perform various functions, e.g., charging of the HHC 200 and data transfer between docking and printing station 100 and HHC 200.

Cradle 120 has an open end 122 and a closed end 124 and defines a slot 125 that is configured to receive HHC 200 therein. More specifically, cradle 120 includes a rear housing portion 126 and a generally U-shaped front housing portion 128 that cooperate to form cradle 120 and define slot 125 therebetween. The U-shaped configuration of front housing portion 128, as best shown in FIG. 1, guides the insertion of HHC 200 into open end 122 of cradle 120 and through slot 125 to help ensure proper alignment of and engagement between HHC 200 and cradle 120, while also permitting access to keypad 210 and visualization of screen 220 of HHC 200 when HHC 200 is engaged within cradle 120. Cradle 120 further includes one or more electrical contacts 130 (FIGS. 3-5) that are coupled to the electronics disposed within housing 110. Electrical contacts 130 (FIGS. 3-5) of cradle 120 are configured to electrically connect to one or more corresponding electrical contacts 230 (FIGS. 6-8) of HHC 200 when HHC 200 is engaged therein to permit communication between the electronics of housing 110 and HHC 200 for performing various functions, e.g., charging, data transfer, printing, etc.

Alternatively, cradle 120 may include a plurality of apertures defined within bottom surface 240 thereof (see FIGS. 6-8) that include internal electrical contacts (not explicitly shown) such that, upon engagement of HHC 200 and cradle 120, the internal electrical contacts (not explicitly shown) of HHC 200 and electrical contacts (not explicitly shown) disposed on hub 342 of base member 340 permit communication between the electronics of housing 110 and HHC 200 for performing various the functions, e.g., charging, data transfer, printing, etc. In such an embodiment, contacts 130, 230 may function as non-conductive placeholders, or stop members, that help ensure proper positioning of HHC 200 within housing 110 and inhibit damage during insertion/removal of HHC 200.

Figure 3:
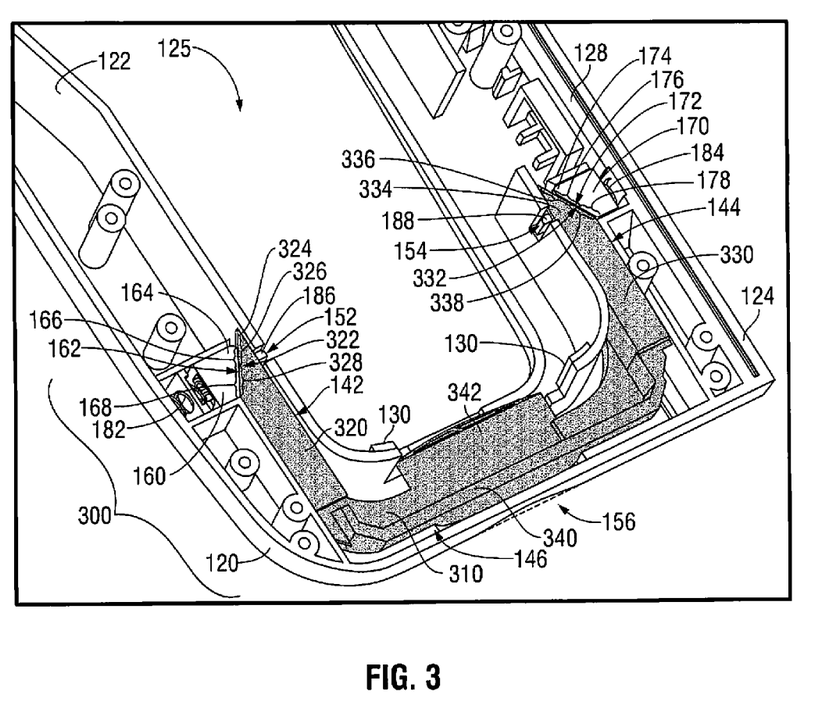
FIG. 3 is a perspective view of the cradle of the docking and printing station of FIGS. 1-2, wherein a portion of a housing of the cradle has been removed to show a latching mechanism disposed therein, the latching mechanism disposed in an unlocked position.
Figure 4:
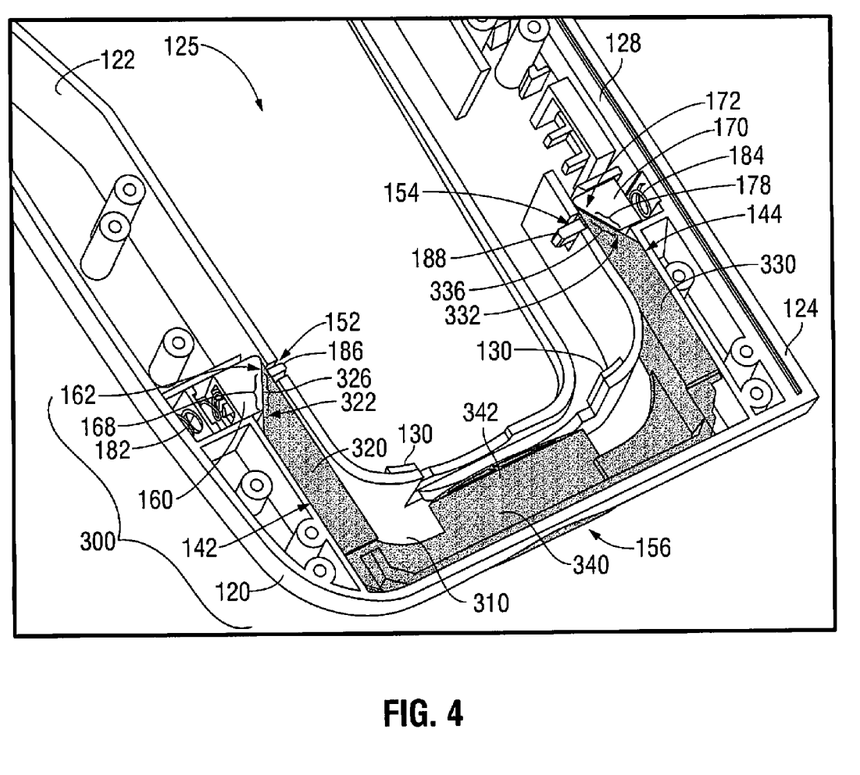
FIG. 4 is a perspective view of the cradle of FIG. 3, wherein the latching mechanism is disposed in a locked position.
Figure 5:
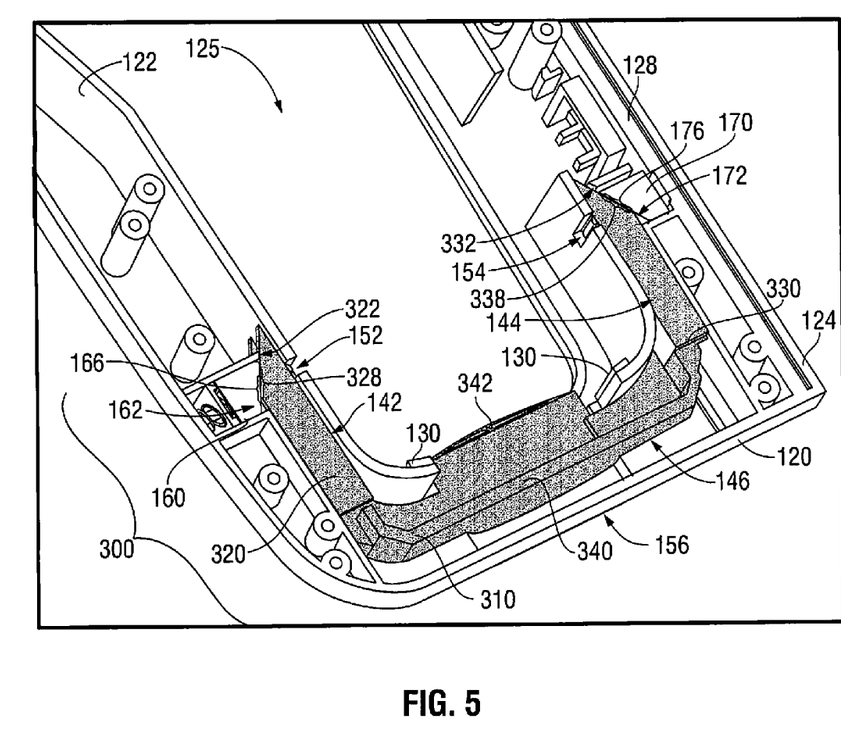
FIG. 5 is a perspective view of the cradle of FIG. 3, wherein the latching mechanism is disposed in an eject position.

Turning now to FIGS. 3-5, in conjunction with FIGS. 1-2, cradle 120 also includes a releasable latching mechanism 300 configured to automatically lock HHC 200 in engagement within cradle 120 upon insertion of HHC 200 therein and to retain HHC 200 in electrical and mechanical engagement within cradle 120 despite external forces acting thereon, e.g., due to movement, manipulation or dropping of docking and printing station 100 and/or contact with other objects. Further, latching mechanism 300 allows for single-handed disengagement, or ejection of HHC 200 from cradle 120 and provides audible and tactile feedback to the user, e.g., in the form of a "click," upon engagement of HHC 200 to and/or disengagement of HHC 200 from cradle 120, thus allowing the user to confirm the engagement/disengagement thereof. Upon mechanical disengagement or ejection of HHC 200 from cradle 120, HHC 200 is simultaneously electrically disconnected from cradle 120. Latching mechanism 300 is described in greater detail hereinbelow.

Continuing with reference to FIGS. 3-5, U-shaped front housing portion 128 of cradle 120 is shown including latching mechanism 300 disposed therein. As mentioned above, cradle 120 is formed from rear housing portion 126 (FIG. 2) and front housing portion 128; however, in the remaining Figures (FIGS. 3-8), rear housing portion 126 has been removed to show the internal components of cradle 120, namely, latching mechanism 300.

Latching mechanism 300 generally includes a U-shaped member 310 having first and second legs 320, 330, respectively, interconnected by a base member 340. U-shaped member 310 is disposed within cradle 120 and is translatable relative thereto between an unlocked position (FIG. 3), a locked position (FIG. 4), and a eject position (FIG. 5) to facilitate the engagement and disengagement of HHC 200 (FIGS. 1-2) within cradle 120. More specifically, each leg 320, 330 of U-shaped member 310 is disposed within a channel 142, 144, respectively, defined within cradle 120 on either longitudinal side of slot 125, while base member 340 is disposed within a base channel 146 extending transversely across closed end 124 of cradle 120. Legs 320, 330 each define an angled surface 322, 332 at free end 324, 334, respectively, thereof, and are longitudinally translatable within channels 142, 144, respectively. Base member 340 includes a hub 342 extending therefrom towards slot 125 and is movable within base channel 146. As such, channels 142, 144 and base channel 146 of cradle 120 permit movement of legs 320, 330 and base member 340, respectively, therethrough as U-shaped member 310 is moved between the unlocked position (FIG. 3), the locked position (FIG. 4), and the eject position (FIG. 5).

Latching mechanism 300 further includes a pair of spring-biased slide blocks 160, 170 disposed within cradle 120 on either side of slot 125. More specifically, first slide block 160 defines an angled surface 162 at free end 164 thereof that is configured to abut and slide along angled surface 322 of leg 320. First slide block 160 is coupled to cradle 120 via a spring 182 (or other suitable biasing member) that biases slide block 160 inwardly towards slot 125. Similarly, second slide block 170 defines an angled surface 172 at free end 174 thereof that is configured to abut and slide along angled surface 332 of leg 330. Second slide block 170 is coupled to cradle 120 via a spring 184 (or other suitable biasing member) that biases slide block 170 inwardly towards slot 125 such that first and second slide blocks 160, 170, respectively, oppose one another on either side of slot 125 of cradle 120.

Slide blocks 160, 170 each further include a pin 186, 188, respectively, extending inwardly therefrom and through longitudinal slots (not explicitly shown) defined within respective legs 320, 330 of U-shaped member 310. As will be described in greater detail below, as U-shaped member 310 is translated relative to cradle 120, angled surfaces 162, 172 of slide blocks 160, 170, respectively, are slid along angled surfaces 322, 332 of legs 320, 330, respectively, such that pins 186, 188 are translated laterally relative to cradle 120, e.g., inwardly through apertures 152, 154 of cradle 120 and into slot 125 and outwardly, retracting back through apertures 152, 154 of cradle 120 (depending on the direction of translation of U-shaped member 310), such that latching mechanism 300 is transitioned between the unlocked, locked and ejected positions. Further, as latching mechanism 300 is transitioned between the unlocked, locked and ejected positions, hub 342 of base member 340 is transitioned between a first position (FIG. 3), wherein hub 342 is disposed substantially within base channel 146 and extends partially therefrom into slot 125, a second position (FIG. 4), wherein hub 342 is completely disposed within base channel 146 and is positioned in close proximity to eject aperture 156 defined within cradle 120, and a third position (FIG. 5), wherein hub 342 extends substantially from base channel 146 into slot 125 to eject HHC 200 (FIGS. 1-2) from cradle 120.

With continued reference to FIGS. 3-5, and initially to FIG. 3, cradle 120 is shown with latching mechanism 300 disposed in the unlocked position. In this position, U-shaped member 310 is disposed in the unlocked position wherein legs 320, 330 extend completely through channels 142, 144, respectively, such that angled surfaces 322, 332, of legs 320, 330, respectively, abut angled surfaces 162, 172, respectively, of slide blocks 160, 170, respectively, substantially along the entire lengths of surfaces 322, 332 and 162, 172, respectively. Due to this configuration, slide blocks 160, 170 are urged outwardly against the bias of springs 182, 184, respectively. With slide blocks 160, 170 in this outward position, pins 186, 188, respectively, remain disposed within cradle 120, i.e., pins 186, 188 do not extend through apertures 152, 154, respectively, into slot 125. Further, in this unlocked position, hub 342 of base member 340 is disposed in the first position, wherein hub 342 extends from base channel 146 partially into slot 125 defined within cradle 120.

As shown in FIG. 4, in the locked position, U-shaped member 310 is retracted relative to cradle 120 such that legs 320, 330, are partially retracted from channels 142, 144, respectively, and such that hub 342 no longer extends into slot 125, but is disposed within base channel 146 of cradle 120 adjacent eject aperture 156 defined within cradle 120. With legs 320, 330, partially retracted from channels 142, 144, respectively, only the first portions 326, 336, of angled surfaces 322, 332 of legs 320, 330, respectively, and second portions 168, 178 of angled surfaces 162, 172, of slide blocks 160, 170, respectively, abut one another, thus allowing springs 182, 184 to bias slide blocks 160, 170, respectively, further inwardly toward slot 125 such that pins 186, 188 of slide blocks 160, 170, respectively, extend inwardly through apertures 152, 154, respectively, and into slot 125.

FIG. 5 shows cradle 120 wherein latching mechanism 300 is disposed in the eject position. In this position, legs 320, 330 of U-shaped member 310 extend through channels 142, 144, respectively, such that free ends 324, 334 of legs 320, 330, respectively, extend past slide blocks 160, 170, respectively, i.e., beyond the unlocked position (FIG. 3). With free ends 324, 334 of legs 320, 330, respectively, extending beyond slide blocks 160, 170, respectively, only the second portions 328, 338, of angled surfaces 322, 332 of legs 320, 330, respectively, and first portions 166, 176 of angled surfaces 162, 172 of slide blocks 160, 170, respectively, abut one another, thus urging slide blocks 160, 170 further outwardly (as compared to the unlocked position (FIG. 3)) against the bias of springs 182, 184, respectively. With slide blocks 182, 184 in this further outward position, pins 186, 188 are retracted within cradle 120, i.e., pins 186, 188 do not extend into slot 125. Further, in this eject position, hub 342 of base member 340 extends substantially from base channel 146 of cradle 120 into slot 125.

Figure 6:
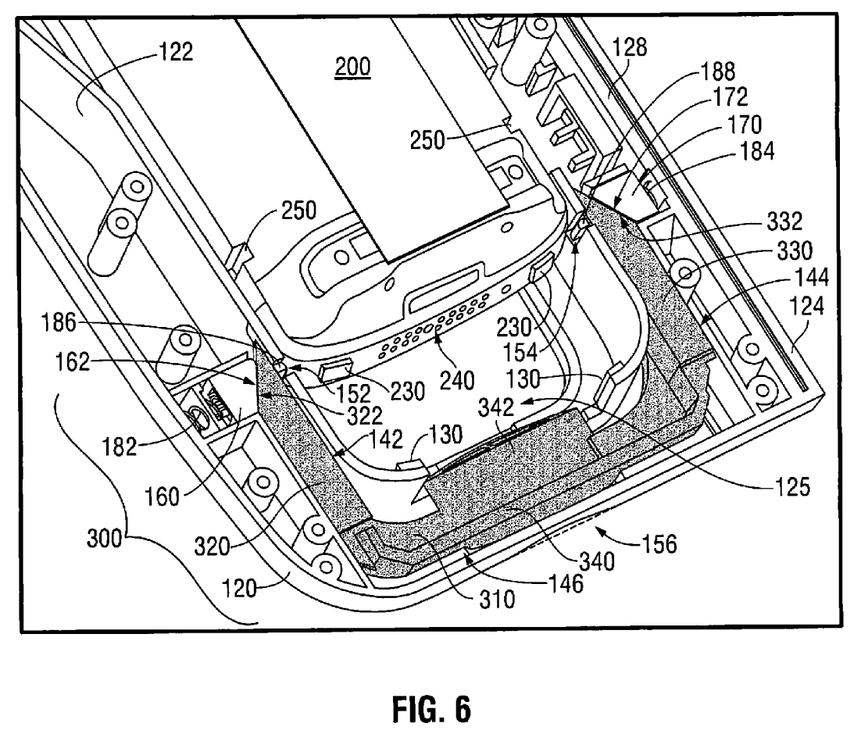
FIG. 6 is a perspective view of the cradle of FIG. 3, wherein the handheld computer is being inserted into the cradle.
Figure 7:
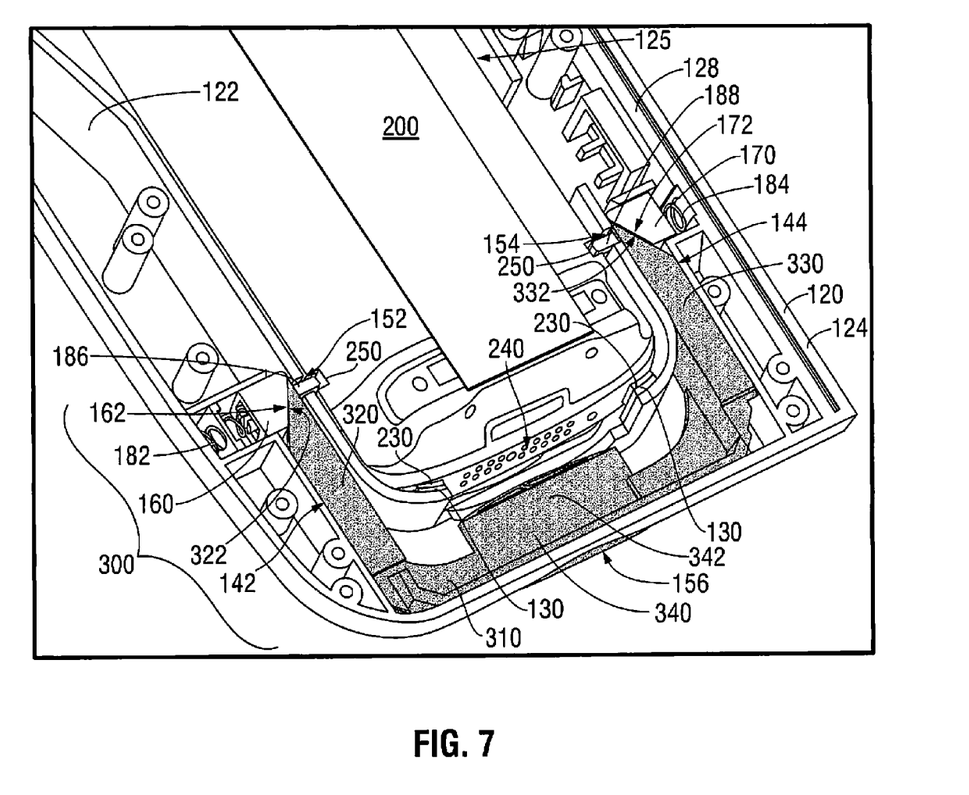
FIG. 7 is a perspective view of the cradle of FIG. 3, wherein the latching mechanism is disposed in the locked position engaging the handheld computer within the cradle.
Figure 8:
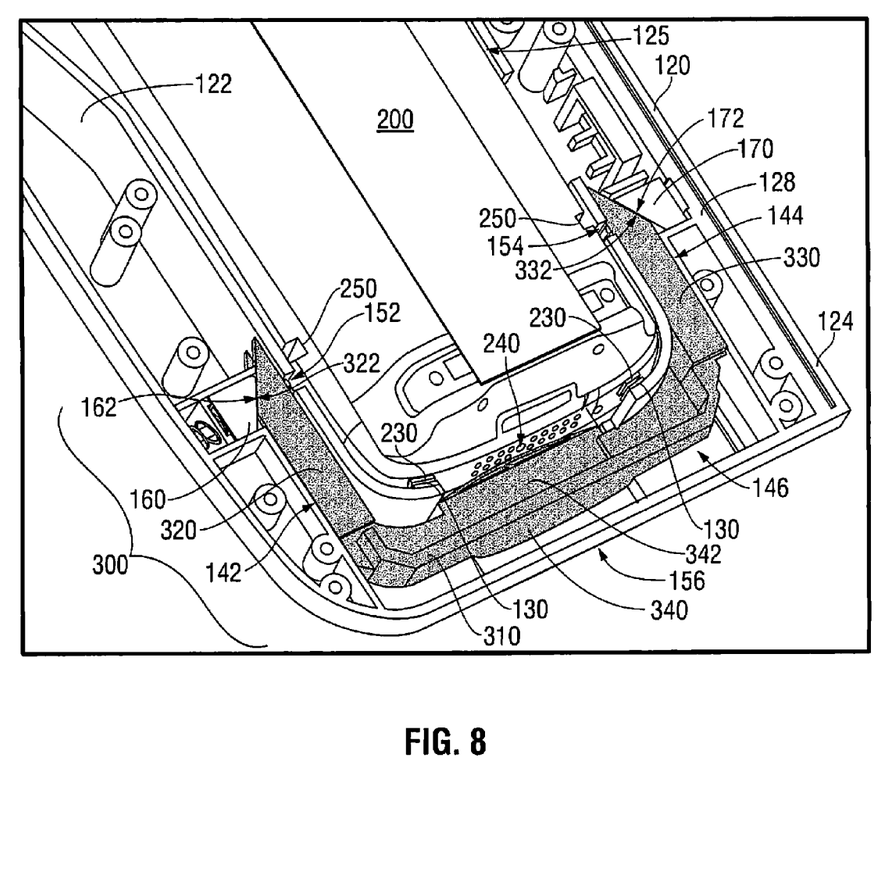
FIG. 8 is a perspective view of the cradle of FIG. 3, wherein the latching mechanism has been moved to the eject position to eject the handheld computer from the cradle.

Turning now to FIGS. 6-8, in conjunction with FIGS. 1-5, the operation of latching mechanism 300 during engagement and disengagement of HHC 200 from within cradle 120 is described. Initially, prior to engagement of HHC 200 within cradle 120, as shown in FIG. 6, latch mechanism 300 is disposed in the unlocked position. In order to engage HHC 200 within cradle 120, with latch mechanism 300 disposed in the unlocked position, HHC 200 is inserted into slot 125 defined within cradle 120 from open end 122 thereof and is advanced therethrough towards base member 340 of U-shaped member 310. As mentioned above, the U-shaped configuration of cradle 120 facilitates the insertion of HHC 200 into slot 125 and helps to ensure proper alignment of HHC 200 within cradle 120.

Continuing with reference to FIGS. 1-8, and to FIGS. 6-7 in particular, as HHC 200 is inserted into cradle 120, bottom surface 240 of HHC 200 is moved towards approximation with hub 342 of base member 340, which extends partially from base channel 146 of cradle 120 into slot 125 when disposed in the unlocked position; opposed notches 250 defined on either side of HHC 200 are moved towards alignment with apertures 152, 154 defined within cradle 120; and electrical contacts 230 of HHC 200 are moved towards approximation with electrical contacts 130 of cradle 120.

Upon further insertion of HHC 200 into cradle 120, bottom surface 240 of HHC 200 eventually contacts hub 342 of base member 340 and urges hub 342 from slot 125 back into base channel 146 such that HHC 200 is permitted to be moved to the fully inserted position, as shown in FIG. 7, wherein opposed notches 250 of HHC 200 are aligned with apertures 152, 154 of cradle 120 and wherein electrical contacts 130, 230 of cradle 120 and HHC 200, respectively, mate with one another to establish electrical connection therebetween. As HHC 200 urges hub 342 of base member 340 of U-shaped member 310 back into base channel 146 of cradle 120 to permit movement of HHC 200 to the fully inserted position, legs 320, 330 of U-shaped member 310 are likewise retracted relative to cradle 120 such that legs 320, 330 are partially retracted from channels 142, 144, respectively. In other words, the urging of hub 342 of U-shaped member 310 to retract within base channel 146 effects similar urging of legs 320, 330 to retract from channels 142, 144, respectively. Retraction of legs 320, 330 relative to channels 142, 144 causes angled surfaces 322, 332 of legs 320, 330, respectively, to slide along angled surfaces 162, 172 of slide blocks 160, 170, respectively, until only the first portions 326, 336, of angled surfaces 322, 332 of legs 320, 330, respectively, and second portions 168, 178 of angled surfaces 162, 172, of slide blocks 160, 170, respectively, abut one another. As this position is achieved, springs 182, 184 bias slide blocks 160, 170, respectively, further inwardly toward slot 125 such that pins 186, 188 of slide blocks 160, 170, respectively, extend inwardly through apertures 152, 154, respectively, into slot 125, and, ultimately, into engagement with opposed notches 250 of HHC 200 to lock, or engage HHC 200 with cradle 120.

Thus, upon insertion of HHC 200 into cradle 120 to the fully inserted position, latch mechanism 300 is transitioned from the unlocked position to the locked position to automatically lock HHC 200 therein. In the locked position, HHC 200 is held in mechanical engagement, e.g., via the engagement of pins 186, 188 and notches 250, as well as in electrical communication, e.g., via the mating of contacts 130 and 230, with cradle 120 sufficiently to withstand manipulation, dropping, and/or contact with other objects. Further, an audible and tactile "click" is produced upon the biasing of pins 186, 188 into engagement within notches 250, allowing the user to confirm that HHC 200 is locked in engagement within cradle 120. With HHC 200 engaged within cradle 120 in the locked position, charging of HHC 200, data transfer between HHC 200 and docking and printing station 100 (FIGS. 1-2), printing of receipts, orders, confirmations, or other communications from HHC 200, etc. may be effected.

Turning now to FIG. 8, in conjunction with FIGS. 1-5, in order to eject, or disengage HHC 200 from cradle 120, the user inserts one or more fingers into eject aperture 156 defined within cradle 120 and urges base member 340 of U-shaped member 310 towards HHC 200. As base member 340 is urged towards HHC 200 and relative to cradle 120, legs 320, 330 are likewise translated relative to cradle 120 such that free ends 324, 334, of legs 320, 330, respectively, are extended through channels 142, 144 past slide blocks 160, 170, respectively. As free ends 324, 334 of legs 320, 330, respectively, are translated past slide blocks 160, 170, respectively, angled surfaces 322, 332, of legs 320, 330 are slid along angled surfaces 162, 172 of slide blocks 160, 170, respectively, until only the second portions 328, 338, of angled surfaces 322, 332 of legs 320, 330, respectively, and first portions 166, 176 of angled surfaces 162, 172 of slide blocks 160, 170, respectively, abut one another. Due to the angled configurations of legs 320, 330 and slide blocks 160, 170, the sliding of angled surfaces 322, 332 of legs 320, 330 relative to angled surfaces 162, 172 of slide blocks 160, 170, respectively, urges slide blocks 160, 170 outwardly against the bias of springs 182, 184, respectively such that pins 186, 188 are retracted from notches 250 of HHC 200 and apertures 152, 154, respectively, thus transitioning latching mechanism 300 to the eject position and disengaging HHC 200 from cradle 120. At the same time as the mechanical disengagement of HHC 200 from cradle 120, electrical contacts 130, 230 are disengaged from one another, thereby electrically disengaging HHC 200 and cradle 120 from one another.

Simultaneously with the transitioning of latching mechanism 300 from the locked position to the eject position, as described above, hub 342 of base member 340 of U-shaped member 310 is advanced into slot 125, e.g., due to the user's urging of base member 340 toward HHC 200. As such, hub 342 urges bottom surface 240 of HHC 200 upwardly such that HHC 200 is at least partially ejected from slot 125 of cradle 120, thus facilitating full removal of HHC 200 from slot 125 of cradle 120. As can be appreciated in view of the above, the disengagement (both mechanical and electrical disengagement) and ejection of HHC 200 from cradle 120 may be accomplished using only a single hand, e.g., simply by inserting one or more fingers into eject aperture 156 and urging base member 340 upwardly. Further, an audible and tactile "click" may be produced as pins 186, 188 are withdrawn from notches 250 of HHC 200, allowing the user to confirm that HHC 200 has been disengaged from cradle 120.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:
1. A cradle latching mechanism, comprising:
a housing defining a slot configured to receive a handheld device therein, the housing including first and second slide blocks disposed therein on either side of the slot, each slide block including a pin extending therefrom and movable between a retracted position, wherein the pin is disposed within the housing, and an extended position, wherein the pin extends into the slot to engage the handheld device disposed therein; and a U-shaped member disposed within the housing and including first and second legs interconnected by a base, each leg operably coupled to one of the slide blocks, the U-shaped member movable relative to the housing between an unlocked position, wherein the legs retain the slide blocks in the retracted position to permit insertion of the handheld device into the slot, a locked position, wherein the slide blocks are permitted to move to the extended position to engage the handheld device therein, and an eject position, wherein the legs retain the slide blocks in the retracted position and wherein the base extends into the slot to eject the handheld device at least partially from the slot.

2. The cradle latching mechanism according to claim 1, wherein the slide blocks are biased toward the extended position.

3. The cradle latching mechanism according to claim 1, wherein audible feedback is provided upon engagement of the pins and the handheld device.

4. The cradle latching mechanism according to claim 1, wherein audible feedback is provided upon disengagement of the pins from the handheld device.

5. The cradle latching mechanism according to claim 1, wherein insertion of the handheld device into the slot moves the U-shaped member to the locked position to engage the handheld device therein.

6. The cradle latching mechanism according to claim 1, wherein the housing includes an aperture defined therethrough adjacent the base of the U-shaped member to facilitate manual movement of the U-shaped member from the locked position to the eject position.

7. The cradle latching mechanism according to claim 1, wherein each of the slide blocks includes an angled surface configured to slideably engage an angled surface defined at a free end of one of the legs such that, upon movement of the U-shaped member from the unlocked position to the locked position, the angled surfaces of the legs are slid along the angled surfaces of the slide blocks, allowing the slide blocks to move to the extended position.

8. A system, comprising:
a handheld device including a pair of opposed notches defined therein;
a docking station including a printer and a cradle coupled to the printer, the cradle including a housing defining a slot configured to receive the handheld device therein for mechanically engaging the handheld device within the cradle and electrically coupling the handheld device to the printer, the housing including first and second slide blocks coupled thereto on either side of the slot, each slide block including a pin extending therefrom and movable between a retracted position, wherein the pin is disposed within the housing, and an extended position, wherein the pin extends into the slot to engage one of the notches defined within the handheld device; and a U-shaped member disposed within the housing and including first and second legs interconnected by a base, each leg operably coupled to one of the slide blocks, the U-shaped member movable relative to the housing between an unlocked position, wherein the legs retain the slide blocks in the retracted position to permit insertion of the handheld device into the slot, a locked position, wherein the slide blocks are permitted to move to the extended position to engage the pins within the notches, and an eject position, wherein the legs retain the slide blocks in the retracted position and wherein the base extends into the slot to eject the handheld device at least partially from the slot.

9. The system according to claim 8, wherein the slide blocks are biased toward the extended position.

10. The system according to claim 8, wherein audible feedback is provided upon engagement of the pins and the handheld device.

11. The system according to claim 8, wherein audible feedback is provided upon disengagement of the pins from the handheld device.

12. The system according to claim 8, wherein insertion of the handheld device into the slot moves the U-shaped member to the locked position to engage the handheld device therein.

13. The system according to claim 8, wherein the housing includes an aperture defined therethrough adjacent the base to facilitate manual movement of the U-shaped member from the locked position to the eject position.

14. The system according to claim 8, wherein the housing includes at least one electrical contact disposed therein, the at least one electrical contact configured to mate with at least one corresponding electrical contact disposed on the handheld device upon engagement of the handheld device and the housing.

15. A method of using a handheld device and corresponding docking station, the method comprising the steps of:
providing a handheld device;
providing a docking station defining a slot configured to receive the handheld device therein, the docking station including first and second slide blocks disposed therein on either side of the slot, the docking station including a U-shaped member disposed therein, the U-shaped member including first and second legs interconnected by a base, each of the legs operably coupled to one of the slide blocks;
inserting the handheld device into the slot of the docking station;
advancing the handheld device further into the slot of the docking station such that the handheld device contacts at least a portion of the base of the U-shaped member to translate the U-shaped member from an unlocked position to a locked position, wherein, translation of the U-shaped member from the unlocked position to the locked position moves the legs relative to the slide blocks such that the slide blocks are moved into engagement with the handheld device to engage the handheld device and the docking station to one another; and
manually urging the base of the U-shaped member relative to the docking station such that the U-shaped member is translated from the locked position to an eject position, wherein, translation of the U-shaped member from the locked position to the eject position moves the legs relative to the slide blocks such that the slide blocks are disengaged from the handheld device, and wherein, translation of the U-shaped member from the locked position to the eject position ejects the handheld device at least partially from the slot.

16. The method according to claim 15, wherein, upon engagement of the handheld device within the docking station, at least one electrical contact of the handheld device mates with at least one electrical contact of the docking station.

17. The method according to claim 16, further comprising the step of electrically communicating between the handheld device and the docking station via the electrical contacts when the handheld device is engaged within the docking station.

18. The method according to claim 15, wherein the docking station includes an aperture defined therethrough adjacent the base of the U-shaped member to facilitate manual urging of the U-shaped member from the locked position to the eject position.

19. The method according to claim 15, further comprising the step of audibly confirming engagement of the handheld device within the docking station.

20. The method according to claim 15, further comprising the step of audibly confirming disengagement of the handheld device from the docking station.

* * * * *